(No Model.)
F. G. WHELAN.
HOOK AND EYE FASTENING.
No. 294,554. Patented Mar. 4, 1884.
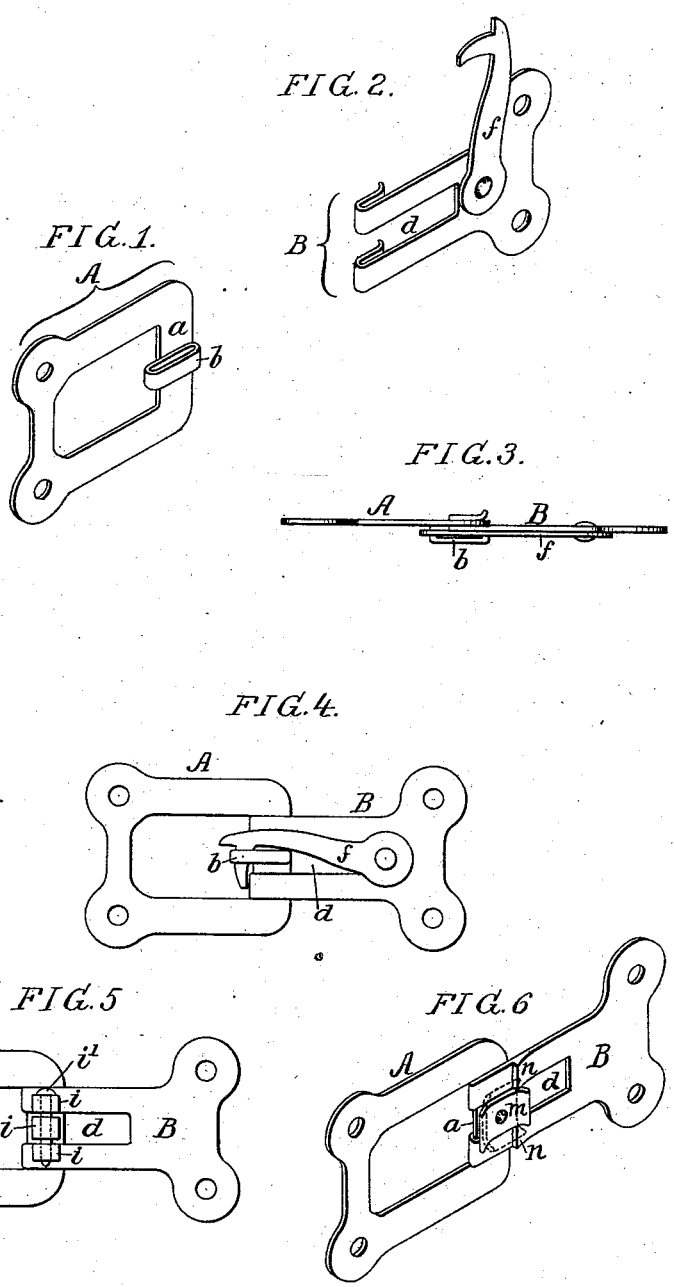
WITNESSES:
Harry Drury
James F. Tobin
INVENTOR:
Frances G. Whelan
by her Attorneys
Howson & Sons

UNITED STATES PATENT OFFICE.

FRANCES G. WHELAN, OF PHILADELPHIA, PENNSYLVANIA.

HOOK-AND-EYE FASTENING.

SPECIFICATION forming part of Letters Patent No. 294,554, dated March 4, 1884.

Application filed October 15, 1883. (No model.)

*To all whom it may concern:*

Be it known that I, FRANCES G. WHELAN, a citizen of the United States, and a resident of Philadelphia, Pennsylvania, have invented certain Improvements in Hook-and-Eye Fastenings, of which the following is a specification.

The object of my invention is to prevent the accidental release of the hook from the eye after they have been coupled, and this object I attain by combining with said hook and eye a retaining device of a character fully set forth hereinafter.

In the accompanying drawings, Figure 1 is a perspective view of the eye, and Fig. 2 a similar view of the hook of the fastening, provided with a retainer forming the subject of my invention, Fig. 3 being a plan view, and Fig. 4 a perspective view, showing the hook and eye adapted to each other and held in position by the retainer; and Figs. 5 and 6, views showing modified forms of retainers.

In Figs. 1 to 4, A represents the eye, and B the hook, of the fastening, these parts being adapted to interlock, as usual, and being of any desired size or shape, and constructed for being sewed or otherwise attached to a garment. On the end bar, $a$, of the eye A is a central loop, $b$, and in the hook B is a central recess, $d$, through which the loop $b$ projects when the hook and eye are interlocked, as shown in Figs. 3 and 4. Pivoted to the hook B is a hook, $f$, of such a character that when the parts are thus interlocked it may be adapted to the loop $b$, thereby effectually preventing the release of the hook B from the eye A, as any longitudinal movement of one independent of the other is impossible.

While I prefer this form of retainer, the use of a loop and hook is not absolutely necessary to the carrying out of my invention. For instance, the hook and eye may have coinciding loops $i$, adapted for the reception of a retaining-pin, $i'$, as shown in Fig. 5; or a turn-buckle, $m$, hung to the end bar of the eye A, as shown in Fig. 6, may be used, if desired, the hook in the latter case being furnished with shoulders $n$, against which the turn-buckle can bear, and said turn-buckle having sufficient elasticity to pass these shoulders in being turned from the position shown in full lines to that shown in dotted lines.

I claim as my invention—

1. The combination of the eye A of the fastening, the hook B, adapted to engage with the end bar, $a$, of the eye, and having a longitudinal opening, $d$, and a retaining device, substantially as described, part of which is carried by the bar $a$, and is adapted to the recess $d$ of the hook, as set forth.

2. The combination of the eye A, having a loop, $b$, with the hook B, having a central recess, $d$, and pivoted hook $f$, as set forth.

In testimony whereof I have signed my name to this specification in the presence of two subscribing witnesses.

FRANCES G. WHELAN.

Witnesses:
 JOHN E. PARKER,
 HARRY SMITH.